United States Patent [19]

Wong et al.

[11] Patent Number: 4,587,645

[45] Date of Patent: May 6, 1986

[54] DISC DRIVE ASSEMBLY

[75] Inventors: Walter Wong, Longmont; Robert Abrams, Boulder; Alan Nagl, Longmont; William Repphun, Boulder, all of Colo.

[73] Assignee: MiniScribe Corporation, Longmont, Colo.

[21] Appl. No.: 607,668

[22] Filed: May 7, 1984

[51] Int. Cl.$^4$ ............................................. G11B 5/82
[52] U.S. Cl. ........................................ 369/75.1; 360/86; 360/98; 369/291; 369/266
[58] Field of Search ................... 360/97, 98, 86; 369/75.1, 270, 291, 266

[56] References Cited

U.S. PATENT DOCUMENTS

| | | | |
|---|---|---|---|
| 3,631,423 | 12/1971 | Groom | 360/97 |
| 3,731,291 | 5/1973 | Walsh | 360/98 |
| 3,849,800 | 11/1974 | Cuzner et al. | 360/97 |
| 4,307,425 | 12/1981 | Kaneko et al. | 360/98 |
| 4,329,722 | 5/1982 | West | 360/98 |
| 4,418,369 | 11/1983 | Applequist et al. | 360/98 |
| 4,428,012 | 1/1984 | Applequist et al. | 360/106 |
| 4,471,395 | 9/1984 | Beck et al. | 360/98 |

Primary Examiner—Steven L. Stephan
Attorney, Agent, or Firm—Curtis, Morris & Safford

[57] ABSTRACT

A venturi or other air deflecting means is provided on the inside of the casing of a disc drive. The venturi or air deflecting means is arranged so that air, which is caused to move by the rotating disc, passes it and creates the lowest pressure inside the disc casing. This low pressure area is communicated to atmospheric pressure.

22 Claims, 13 Drawing Figures

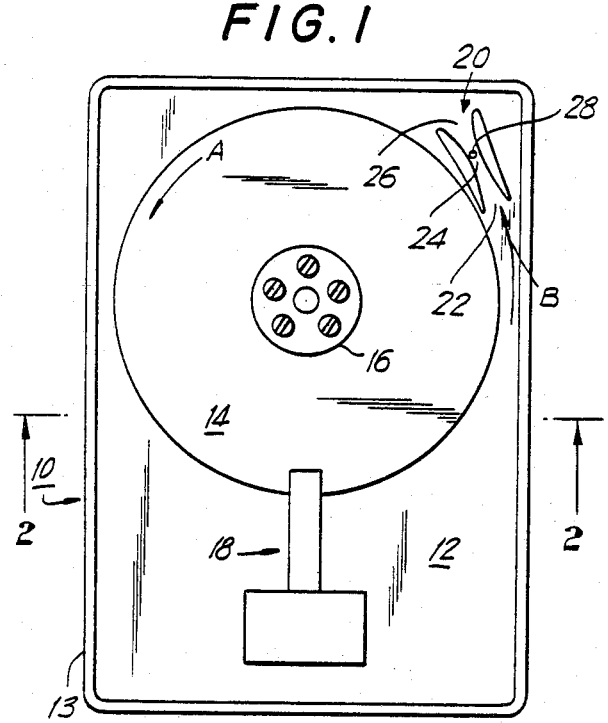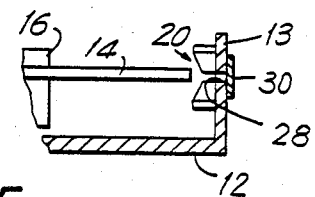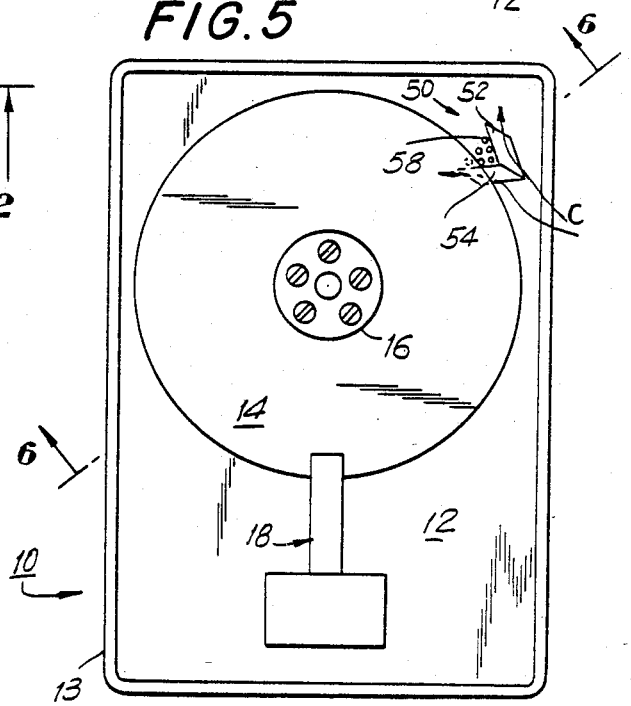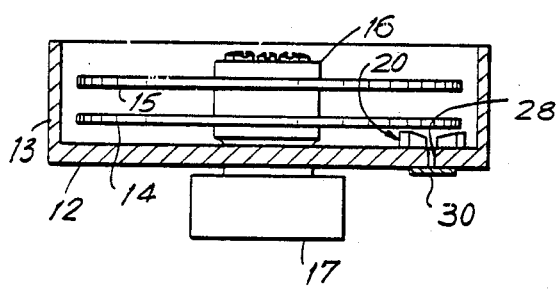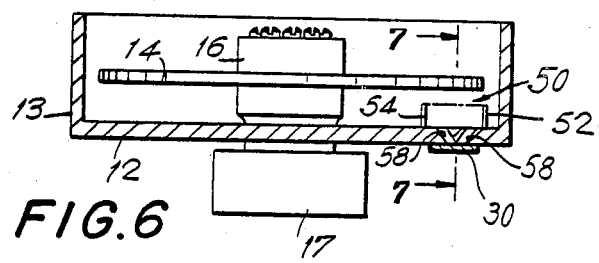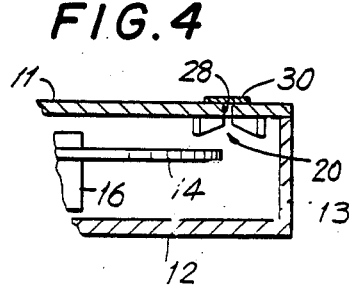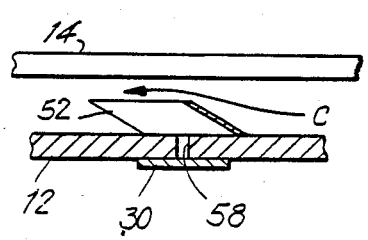

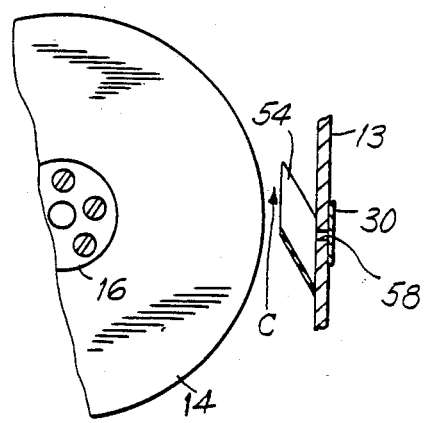
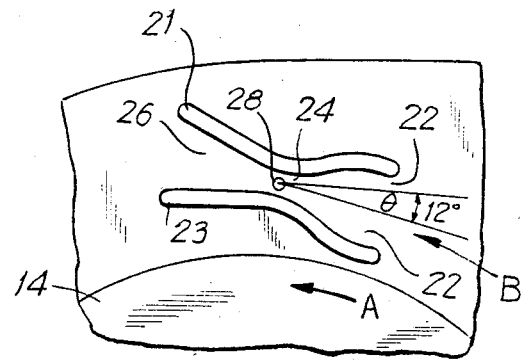
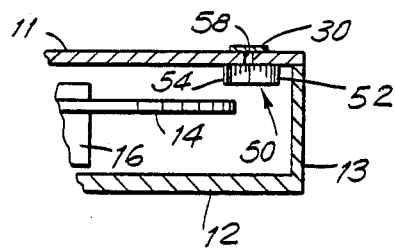
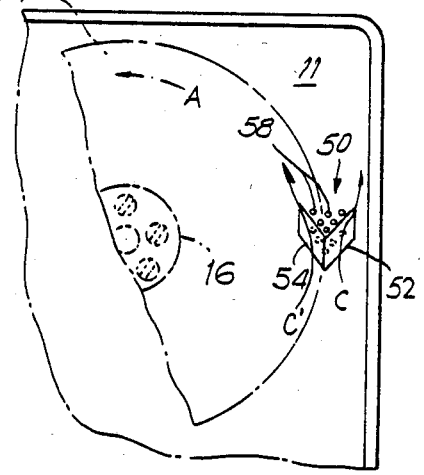
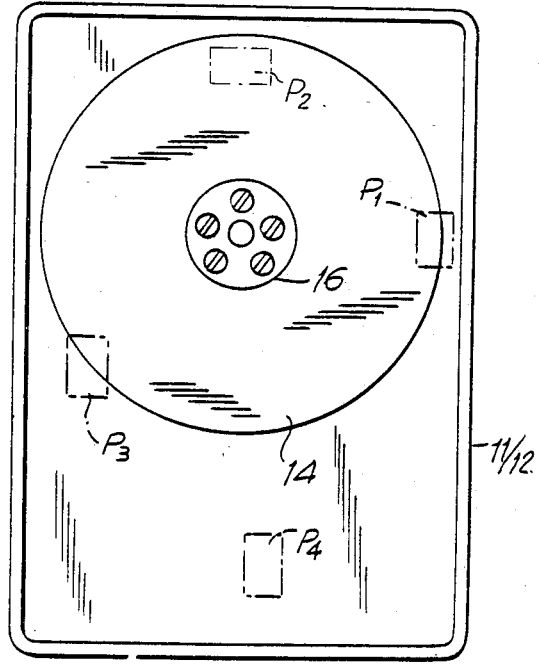
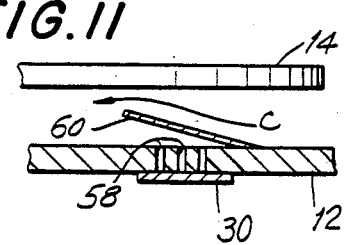

DISC DRIVE ASSEMBLY

BACKGROUND OF THE INVENTION

This invention relates to a disc drive assembly and, more particularly, to apparatus used with that assembly for maintaining proper pressure within the housing thereof.

Disc drive apparatus are known wherein a rapidly rotating "rigid" magnetic disc has information written thereon and read therefrom. Typically, such disc drive apparatus, also known as Winchester Drive disc systems, are provided with one or more discs having diameters on the order of 14 inches, 8 inches, 5¼ inches and, more recently, 3½ inches. A conventional disc drive assembly is described in, for example, U.S. Pat. No. 4,418,369, assigned to the assignee of the present invention.

In the disc drive assembly described in the aforementioned patent, two magnetic discs are provided in a substantially sealed housing. Information is written onto each disc and read therefrom in digital form by means of a so-called "flying head". The head, or magnetic transducer, moves across the surface of the disc in a generally radial direction to write or read information on selected tracks. Movement of the head is provided in accordance with, for example, U.S. Pat. No. 4,428,012, also assigned to the assignee of the present invention. Preferably, in disc drive assemblies of the aforementioned type, information is written on and read from both surfaces of each disc. Thus, four heads may be used with a two-disc assembly.

As is conventional, in the usual disc drive assembly using one, two or more discs, such discs rotate in the environment of a gas, such as air. The housing of the assembly preferably is sealed to prevent contaminants from entering and interfering with the proper writing and reading of data on the discs. However, for various reasons, it is desirable to vent the sealed housing to ambient air. To this effect, filters have been employed successfully to prevent foreign particles from entering into the housing through the venting apparatus.

By reason of the rotation of the discs within the housing, a so-called pressure profile is established therewithin. In the absence of impellers or the like, the mere rotation of the discs inherently causes air to flow through the housing in the general direction of rotation so as to establish a relatively lower pressure at the vicinity of the disc-drive spindle. The pressure increases in the radial direction, resulting in a greater pressure at the outer periphery of the discs.

Typically, and as described in aforementioned U.S. Pat. No. 4,418,369, the disc-drive motor is disposed externally of the sealed housing. Consequently, a "spindle seal" is required to prevent contaminants from entering the housing by way of the opening therein through which passes the drive spindle. It had been thought that the interior pressure of the housing in the direct vicinity of the spindle should exhibit a maximum pressure to prevent contaminants from leaking into the assembly in the event that the spindle seal deteriorates over a period of time. However, as mentioned above, the interior pressure at the vicinity of the spindle due to the rotation of the discs generally is relatively low, and may be less than the ambient pressure. Accordingly, prior art techniques provided means, usually an impeller, a flow obstruction or the like, to increase this pressure to be greater than ambient In U.S. Pat. No. 4,418,369, ambient pressure is supplied directly to the vicinity of the spindle by way of a conduit that communicates with the exterior of the sealed housing via a filter. Hence, the pressure across the spindle seal is essentially balanced because ambient pressure is applied to both sides (i.e. both the interior and exterior pressures are substantially equal to ambient).

The present invention functions to prevent or at least minimize deterioration of the spindle seal and provide positive pressure in the disk drive assembly by way of another technique.

OBJECTS OF THE INVENTION

It is an object of the present invention to provide a disc drive assembly having a substantially sealed housing whose internal pressure is referenced to ambient pressure.

Another object of this invention is to provide a disc drive assembly of the aforementioned type wherein the minimum pressure within the housing is established as substantially ambient pressure.

A further object of this invention is to provide a disc drive assembly of the aforementioned type wherein a flow directing device is provided within the housing to intercept a portion of the gas, or air flow therewithin and, by reason of this interception, to create a minimum pressure at a predetermined location.

An additional object of this invention is to provide a disc drive assembly of the aforementioned type wherein ambient pressure is communicated to the aforesaid predetermined location, thereby making that minimum pressure substantially equal to ambient pressure.

Yet another object of this invention is to provide a disc drive assembly wherein a venturi is provided within the housing of that assembly to create a minimum pressure at the vicinity of the throat of the venturi as a portion of the gas, or air, within the housing is directed therethrough, and to establish this minimum pressure as being substantially equal to ambient pressure. Thus, the minimum pressure within the housing is made substantially equal to ambient.

Another object of this invention is to provide a disc drive assembly wherein an aerodynamic deflector is provided within the housing of that assembly to deflect a portion of the gas, or air, that flows thereabout and thereby create a minimum pressure directly downstream of the deflector, this minimum pressure being made substantially equal to ambient pressure.

A still further object of this invention is to provide a vented disc drive assembly which, in operation, avoids the leakage of contaminants thereinto.

Various other objects, advantages and features of the present invention will become readily apparent from the ensuing detailed description, and other embodiments will be recognized, although not specifically described herein. The novel features of the instant invention will be particularly pointed out in the appended claims.

SUMMARY OF THE INVENTION

In accordance with this invention, a disc drive assembly having a substantially sealed housing and at least one disc rotatably driven therein is provided with means for establishing a positive pressure within the housing. A flow directing device within the housing intercepts a portion of the gas, or air that flows therein so as to create a minimum pressure at a predetermined location of that device. Ambient pressure is communicated to that predetermined location, thereby making the minimum pressure substantially equal to ambient pressure.

In one embodiment of this invention, the flow directing device is formed as a venturi having an inlet of greater cross-sectional area than the throat thereof. The pressure at the throat of the venturi is the minimum pressure within the housing, and ambient pressure is supplied to the throat.

In another embodiment, the flow directing device is formed as an aerodynamic deflector to deflect a portion of the gas, or air flow thereabout, whereby the air pressure directly downstream of the deflector is the minimum pressure within the housing. Ambient pressure is communicated to this downstream location, thus referencing the minimum pressure within the housing to ambient.

BRIEF DESCRIPTION OF THE DRAWINGS

The following detailed description, given by way of example, and not intended to limit the present invention solely thereto, will best be understood in conjunction with the following drawings in which:

FIG. 1 is a top view of a typical disc drive assembly, with the cover of the sealed housing removed, incorporating one embodiment of the present invention;

FIG. 2 is a sectional view taken along lines 2—2 of FIG. 1;

FIG. 3 is a sectional view of a portion of another embodiment of the present invention;

FIG. 4 is a sectional view of a portion of yet another embodiment of the present invention;

FIG. 5 is another top view of a disc drive assembly, with the cover of the sealed housing removed, illustrating a still further embodiment of the present invention;

FIG. 6 is a sectional view taken along lines 6—6 of FIG. 5;

FIG. 7 is a sectional view representing the manner in which the embodiment of FIGS. 5 and 6 operates within the disc drive assembly;

FIG. 8 is a top sectional view of a portion of another embodiment of this invention;

FIG. 9 is a sectional view showing a portion of a still further embodiment of this invention;

FIG. 10 is a plan view of the embodiment shown in FIG. 9;

FIG. 11 is a sectional view of a portion of a still additional embodiment of this invention;

FIG. 12 is an enlarged view of a venturi in accordance with the present invention; and FIG. 13 is a schematic view representing various locations in which the flow directing device of the present invention may be positioned.

DETAILED DESCRIPTION OF CERTAIN PREFERRED EMBODIMENTS

Referring now to the drawings, wherein like reference numerals are used throughout, and more particularly to FIG. 1, a top view of a disc drive assembly 10 is illustrated with the top cover thereof (illustrated in FIG. 4 as top cover 11) removed. The disc drive assembly is comprised of a substantially sealed housing formed of a bottom wall 12, a peripheral or side wall 13 (shown in FIGS. 2 et seq.) and a top cover or wall 11 (which is removed from the view shown in FIG. 1). A suitable seal (not shown) is provided between the top and side walls of the housing to prevent contaminants from leaking therewithin.

The disc drive assembly typically includes one or more rigid discs, one of which is shown in FIG. 1 as disc 14 and two of which are shown in FIG. 2 as discs 14 and 15, suitably mounted on a rotary spindle 16 that is driven by a drive motor 17 (FIG. 2) which may be directly-coupled, belt-coupled or coupled by other suitable transmission to the spindle. Preferably, the drive motor is positioned externally of the sealed housing and is suitably supported thereon. In such an embodiment, bottom wall 12 of the housing is provided with a suitable aperture through which the shaft of the drive motor passes into engagement with spindle 16. A spindle seal surrounds the motor shaft to protect the interior of the housing from the external environment.

In one embodiment, disc 14 is a magnetic disc provided with a suitable magnetic coating on one or both (e.g. the top and/or bottom) surfaces thereof, such as a magnetic oxide coating, to permit the recording of information thereon and the reproduction of such recorded information. In an alternative embodiment, disc 14 is an optical disc from which information is read by optical means.

As is conventional with magnetic discs, information, or data, is "written" onto the disc by means of a suitable transducer, illustrated in FIG. 1 as read/write head assembly 18, this assembly also serving to "read" data from the disc. Typically, data is stored in concentric tracks in a digital format, these tracks being suitably accessed for writing and reading operations in a manner known to those of ordinary skill in the art. Head assembly 18 is comprised of one or more heads for each disc surface that is used to store data, and a suitable head-drive mechanism, or head actuator, urges the heads to move across the surfaces of the discs to access a desired track. As examples, if one disc having only one data-storing surface is provided, head assembly 18 may be provided with a single head to write and read data on that surface. If both surfaces of a single disc are used to store data, the head assembly may be provided with two heads, i.e. one head for each surface. If the disc drive assembly is provided with two discs, head assembly 18 may be provided with one pair of heads for writing and reading data on both surfaces of one disc and another pair of heads for writing and reading data on both surfaces of the other disc. It is appreciated that multiple heads are provided in the event that disc drive assembly 10 contains multiple discs. Head assembly 18 may be of the type described in aforementioned U.S. Pat. No. 4,428,012; and it is appreciated that other conventional assemblies may be used.

As is typical with many disc drive assemblies, assembly 10 of the present invention is provided with venting to the surrounding atmosphere to avoid or minimize deleterious pressure differences due to normal changes in ambient conditions, such as barometric pressure, altitude and the like. Such venting is, of course, provided through filters to prevent foreign particles from passing to the interior of the housing. Because of the inherent centrifugal pumping action caused by the rotation of disc 14 in, for example, the counterclockwise direction represented by arrow "A", pressure gradients exist within the housing to establish so-called pressure profiles therewithin. Desirably, the minimum pressure within the housing should be substantially equal to ambient pressure. If the minimum housing pressure exceeds ambient, a positive pressure differential may be established across the spindle seal which, if sufficiently high, might damage that seal and thus allow contaminants to leak into the housing. Likewise, if the minimum housing pressure is much less than ambient, i.e. if it is a "negative" pressure, a negative pressure differential may be established which also could allow contaminants to leak into the housing. It is a feature of the present invention to establish the minimum housing pressure to be substantially equal to ambient and thus minimize the possibility of damaging the spindle seal or allowing contaminants to leak into the housing.

This feature of the invention is carried out by disposing a flow directing device 20 within the housing to intercept a portion of the air which flows by reason of the centrifugal pumping action of disc 14. In the present description, it is assumed that air is contained within the housing, but the invention need not be limited solely to air. Broadly, any suitable gas that does not interfere with the writing and/or reading of data from disc 14 may be used, provided that whatever interaction may occur between this gas and ambient (of which the latter is assumed to be air) is taken into account. For simplification, it is assumed that "air" is the gas within the housing and as used herein, the word "air" should be interpreted as also meaning such gas.

In the embodiment illustrated in FIG. 1, flow directing device 20 is illustrated as a venturi formed of a pair of guide elements which define an inlet 22, an outlet 26 and a throat 24 disposed between the inlet and outlet. As is conventional, the cross-sectional area of inlet 22 is greater than the cross-sectional area of throat 24. The throat thus provides a constriction to the flow of air through venturi 20. The pumping action of the rotary disc(s) causes the air to flow within the housing in the direction of arrow "B", this air flow being intercepted by the venturi whose axis is substantially parallel to this flow. Venturi 20 may, if desired, be covered with a plate or other means to form a substantially enclosed or sealed device.

In one embodiment, venturi 20 is disposed on the inner surface of bottom wall 12, as illustrated in FIG. 2. It is appreciated that this figure is a sectional view of the embodiment shown in FIG. 1, taken along lines 2—2. FIG. 2 illustrates more clearly the feature of communicating ambient pressure to the vicinity of throat 24 of venturi 20. More particularly, an air passage 28 (also shown in FIG. 1), such as an aperture, through-hole or conduit, is provided in bottom wall 12 to provide communication between throat 24 and the exterior of the housing. A suitable filter 30 is positioned in this communication channel to prevent contaminants from entering the interior of the housing through air passage 28. A suitable recess may be provided in bottom wall 12 to contain filter 30 or, as shown in FIG. 2, the filter merely may be secured to the external surface of this bottom wall. The precise location of the filter should not materially affect the communication of ambient pressure to the vicinity of throat 24 of venturi 20.

Let the following representations be made:
$v_1$ = velocity of the air at inlet 22
$p_1$ = pressure at inlet 22
$z_1$ = elevation at inlet 22
$\gamma_1$ = specific weight of air at inlet 22
$v_2$ = velocity of air at throat 24
$p_2$ = pressure at throat 24
$z_2$ = elevation at throat 24
$\gamma_2$ = specific weight of air at throat 24
$g$ = "gravity"

The well-known Bernoulli equation for the flow of air through venturi 20 is as follows:

$$\frac{v_1^2}{2g} + \frac{p_1}{\gamma_1} + z_1 = \frac{v_2^2}{2g} + \frac{p_2}{\gamma_2} + z_2 + \text{losses}$$

wherein the losses are negligible. It is appreciated that the specific weight of air through the venturi is constant and, therefore, $\gamma_1 = \gamma_2$. Furthermore, it is assumed that the elevation at inlet 22 is equal to the elevation at inlet and, therefore, $z_1 = z_2$. Hence, Bernoulli's equation reduces to:

$$\frac{v_1^2}{2g} + \frac{p_1}{\gamma} = \frac{v_2^2}{2g} + \frac{p_2}{\gamma}$$

It is recognized that the velocity of the air through throat 24 is much greater than the velocity of the air through inlet 22 by reason of the constriction presented by the throat. Hence, $v_2 >> v_1$. As a result, Bernoulli's equation establishes $p_2 << p_1$. Now, to insure that positive pressure (i.e. pressure greater than ambient) is created within the housing, the pressure at neck 24 is made equal to ambient. This is achieved by communicating ambient pressure to the throat by way of air passage 28.

Venturi 20 establishes the pressure at throat 24 as the location of lowest pressure within the housing. Since the pressure at this lowest pressure point is substantially equal to ambient pressure and since the pressure in the remainder of the housing is greater than at this location, it follows that positive pressurization is created within the housing, thereby preventing leakage of contaminants thereinto. That is, the pressure within the housing is referenced to ambient pressure.

FIG. 3 is a sectional view representing another location of venturi 20 within the housing. As shown, the venturi is disposed on side wall 13, preferably adjacent the periphery of disc 14. In a multiple disc drive assembly, the venturi may be positioned adjacent any one of the discs; and in the illustrated embodiment, it is assumed that the venturi is positioned adjacent the lower most disc in the housing. Here too, by reason of air passage 28, ambient pressure is communicated to the vicinity of the throat of the venturi.

FIG. 4 is a sectional view illustrating yet another position of venturi 20. Here, the venturi is illustrated as being disposed on the inner surface of top wall 11 adjacent the outer periphery of disc 14. As will be described below, the venturi may be positioned at any desired location within the housing to intercept the air flow therein; and the positioning thereof need not be limited solely to the vicinity of the periphery of a disc.

In FIGS. 1–4, the flow directing device which is used to intercept a portion of the air flow within the housing to establish a location at which minimum pressure is produced has been assumed to be a venturi device. In an alternative embodiment, this flow directing device may be formed as an aerodynamic deflector. FIG. 5 illustrates one embodiment of an aerodynamic deflector disposed on, for example, bottom wall 12 of the housing. The aerodynamic deflector is illustrated as comprising a pair of angled vanes 52 and 54 which intercept air flowing thereto in a direction represented by arrow "C". By reason of these vanes, air is deflected angularly outward of the intersection thereof, and upwardly over the vanes. It will be appreciated that, as a result of Bernoulli's equation applied to aerodynamic deflector 50, a minimum pressure is produced directly downstream of vanes 52 and 54, and in an area substantially defined by these vanes. This area, which is downstream of the vanes, communicates with ambient pressure by way of air passage(s) 58.

Bernoulli's equation is equally applicable to aerodynamic deflector 50; and it will be seen that the minimum pressure within the housing is established at the location downstream of vanes 52 and 54 and is made substantially equal to ambient. Hence, the housing is pressurized to be greater than ambient pressure by reason of the aerodynamic deflector and air passage(s) 58.

FIG. 6, taken along lines 6—6 of FIG. 5, illustrates another embodiment wherein aerodynamic deflector 50 is disposed on the inner surface of bottom wall 12 at a desired radial distance from the axis of rotation of disc 14. Air passages 58 are seen to communicate through the bottom wall with the exterior of the housing, and filter 30 is positioned over these air passages to prevent contaminants from entering the housing. The centrifugal pumping action caused by the rotation of disc 14 establishes a minimum pressure at a location downstream of vanes 52 and 54, and this minimum pressure is made equal to ambient pressure by air passages 58.

FIG. 7 is a side sectional view of, for example, the embodiment shown in FIG. 5 or in FIG. 6, wherein air flows in the direction represented by the arrow "C" over the aerodynamic deflector. The sectional view shown in FIG. 7 may be assumed to be taken along line 7—7 in FIG. 6, which is the axis of intersection of vanes 52 and 54. Air passage 58 (only one of which is shown) communicates ambient pressure to a location downstream of the aerodynamic deflector, this location exhibiting minimum air pressure.

Another embodiment similar to that shown in FIG. 7 is illustrated in FIG. 8, wherein the aerodynamic deflector is disposed on side wall 13. Air pumped by the rotation of disc 14 flows around and over the aerodynamic deflector to create minimum pressure at a location downstream of the intersection of vanes 52 and 54. This minimum pressure is made substantially equal to ambient pressure by means of air passages 58, only one of which is shown.

FIG. 9 is a sectional view representing the positioning of aerodynamic deflector 50 on the inner surface of top wall 11. In the illustrated embodiment, the aerodynamic deflector is disposed adjacent the outer periphery of disc 14. A plan view of this embodiment is shown in FIG. 10, wherein vanes 52 and 54 are seen to be supported on top wall 11. Air flows across and about aerodynamic deflector 50 in the pattern represented by arrows "C" and "C'". Air passages 58 pass through the top wall to filter 30, the latter serving to prevent contaminants from entering the housing.

Yet another embodiment of an aerodynamic deflector is illustrated by the sectional view shown in FIG. 11, wherein the aerodynamic deflector is comprised of a single angled vane 60 which functions to deflect the air flow represented by the arrow "C" so as to establish a minimum pressure at a location downstream of the deflector. This minimum pressure is made substantially equal to ambient pressure by means of air passage(s) 58. It is recognized that deflector 60 functions in a manner similar to an air foil. The application of Bernoulli's equation to the embodiment shown in FIG. 11 results in a minimum pressure downstream of the deflector, and this minimum pressure is made substantially equal to ambient so as to establish a positive pressurization within the disc drive housing.

Referring now to FIG. 12, a detailed view of venturi 20 is illustrated. As shown, the venturi is comprised of shaped guide members 21 and 23 which intercept air flow B to establish a minimum pressure at throat 24. As a numerical example, the axis of venturi 20 is disposed at an angle $\theta$ of about 10°-14°, preferably 12°, to the tangent of disc 14. If desired, any other suitable angle may be used.

From the foregoing description, it is seen that the flow directing device of the present invention, which may comprise a venturi formed of guide members or molded integrally with an inner surface of the housing, or an aerodynamic deflector which may be formed of a single deflecting vane or a pair of angled vanes, may be disposed on the top, bottom or side wall of the housing, as desired. Furthermore, if disposed on the top or bottom wall of the housing, the flow directing device may be positioned at any desired radial distance from the axis of rotation of disc 14 or radially outward beyond the circumference of the disc. FIG. 13 schematically represents various examples of locations at which the flow directing device may be positioned. For example, the flow directing device may be positioned at locations $P_1$ or $P_3$, both being adjacent the outer periphery of the disc. Alternatively, the flow directing device may be positioned at location $P_2$ on, for example, top wall 11. Still further, the flow directing device may be positioned at location $P_4$ which is beyond the outer periphery of the disc.

While the present invention has been particularly shown and described with reference to several embodiments thereof, it will be readily appreciated by those of ordinary skill in the art that various changes and modifications may be made without departing from the spirit and scope of the invention. For example, disc drive assembly 10 may include a single disc or multiple discs. Furthermore, and as mentioned above, the flow directing device which is used to establish minimum pressure may be formed integrally with the inner surface of the housing of assembly 10, such as by molding the device integrally with an inner surface, or may be formed of separate elements (e.g. guide members 21 and 23 of venturi 20 or angled vanes 52 and 54 of aerodynamic deflector 50) supported on the housing. The flow directing device may be suspended above bottom wall 12 or spaced from side wall 13 by a suitable mount therefor. Still further, filter 30, which prevents contaminants from entering the housing, may be mounted merely on the outer or inner surface of the housing, or may be disposed in a suitable recess provided therefor.

It is intended that the appended claims be interpreted as including the foregoing as well as various other changes, modifications and embodiments.

What is claimed is:

1. In a disc drive assembly having a substantially sealed housing and at least one disc rotatably driven therein to cause a self-contained air flow within said housing by reason of the rotation of said at least one disc, means for establishing a positive air pressure within said housing relative to a minimum air pressure at a predetermined location therein, comprising flow directing means supported on an interior surface of and fully disposed within said housing for intercepting a portion of the self-contained air flow, said flow directing means creating a minimum pressure at a predetermined location thereof; and means for communicating ambient pressure to said predetermined location, thereby making said minimum pressure substantially equal to ambient pressure.

2. The invention of claim 1 wherein said means for communicating comprises at least one air passage from said predetermined location to exterior of said housing; and filter means communicating with said passage.

3. The invention of claim 1 wherein said flow directing means comprises a venturi having an inlet and a throat, the cross-sectional area of the inlet being greater than the cross-sectional area of the throat.

4. The invention of claim 1 wherein said flow directing means comprises an aerodynamic deflector for deflecting a portion of said air flow thereabout to reduce the air pressure downstream of said aerodynamic deflector and within said housing, and said means for communicating supplies ambient pressure to a predetermined location downstream of said aerodynamic deflector.

5. The invention of claim 4 wherein said housing includes top, bottom and side walls; and wherein said aerodynamic deflector is disposed on, said bottom wall.

6. The invention of claim 4 wherein said housing includes top, bottom and side walls; and wherein said aerodynamic deflector is disposed on said top wall.

7. The invention of claim 4 wherein said housing includes top, bottom and side walls; and wherein said aerodynamic deflector is disposed on said side wall.

8. The invention of claim 4 wherein said aerodynamic deflector is disposed adjacent the periphery of said at least one disc.

9. The invention of claim 4 wherein said aerodynamic deflector is comprised of at least one angled vane for deflecting said portion of said air flow; and at least one opening through said housing behind said at least one angled vane and shielded by said vane from said air flow, said at least one opening communicating with the ambient.

10. The invention of claim 2 wherein said filter means is disposed on said housing.

11. In a disc drive assembly having a substantially sealed housing and at least one disc rotatably driven therein to cause a self-contained air flow within said housing by reason of the rotation of said at least one disc, means for establishing a positive air pressure within said housing relative to a minimum air pressure at a predetermined location therein, comprising a venturi having an inlet and a throat, the cross-sectional area of the inlet being greater than the cross-sectional area of the throat, the venturi being supported on an interior surface of said housing for intercepting a portion of the self-contained air flow and creating a minimum pressure at the throat thereof; and means for communicating ambient pressure to the vicinity of said throat, thereby making said minimum pressure substantially equal to ambient pressure.

12. The invention of claim 11 wherein said housing includes top, bottom and side walls, and wherein said venturi is disposed on said bottom wall.

13. The invention of claim 11 wherein said housing includes top, bottom and side walls, and wherein said venturi is disposed on said top wall.

14. The invention of claim 11 wherein said housing includes top, bottom said side walls, and wherein said venturi is disposed on said side wall.

15. The invention of claim 11 wherein said venturi is disposed adjacent the periphery of said at least one disc.

16. The invention of claim 11 wherein said venturi is formed of a pair of guide members converging from said inlet to said throat and diverging from said throat to an outlet within said housing.

17. In a disc drive assembly having a substantially sealed housing and at least one disc rotatably driven therein to cause the air within said housing to flow substantially entirely internally in said housing due substantially only to the rotation of said at least one disc, means for referencing the minimum pressure within said housing to ambient pressure, comprising a venturi supported on an interior surface of said housing, said venturi having an inlet, a throat and an outlet, all within said housing, said inlet being of greater cross-sectional area than said throat to create a minimum pressure at the vicinity of said throat as a portion of the air within said housing is directed to flow through said venturi; means for providing a communication path between the throat of said venturi and the exterior of said housing to establish said minimum pressure at the vicinity of said throat substantially equal to ambient pressure; and filter means disposed in said communication path for inhibiting contaminants from entering said communication path.

18. The invention of claim 17 wherein said venturi is positioned adjacent the periphery of said at least one disc and is formed of a pair of air guide members converging from said inlet to said throat and diverging from said throat to an outlet thereof.

19. The invention of claim 17 wherein said communication path comprises a channel through said housing.

20. In a disc drive assembly having a substantially sealed housing and at least one disc rotatably driven therein to cause the air within said housing to flow substantially entirely internally in said housing due substantially only to the rotation of said at least one disc, means for referencing the minimum pressure within said housing to ambient pressure, comprising aerodynamic deflecting means supported on an interior surface of said housing for deflecting a portion of the internal air flow thereabout and within said housing and thereby create a minimum pressure at a location directly downstream thereof; means for providing a communication path between said location and the exterior of said housing to establish said minimum pressure at said location substantially equal to ambient pressure; and filter means disposed in said communication path for inhibiting contaminants from entering said communication path.

21. The invention of claim 20 wherein said aerodynamic deflecting means is positioned adjacent the periphery of said at least one disc and is formed of at least one angled deflecting vane.

22. The invention of claim 21 wherein said communication path comprises a channel through said housing and terminating behind said at least one angled deflecting vane at said location.

* * * * *

UNITED STATES PATENT AND TRADEMARK OFFICE
CERTIFICATE OF CORRECTION

PATENT NO. : 4,587,645
DATED : May 6, 1986
INVENTOR(S) : Walter Wong et al.

It is certified that error appears in the above-identified patent and that said Letters Patent are hereby corrected as shown below:

Claim 2, line 3, before "exterior" insert --the--.

Signed and Sealed this

Fifteenth Day of July 1986

[SEAL]

Attest:

DONALD J. QUIGG

Attesting Officer

Commissioner of Patents and Trademarks